(12) United States Patent
Dunn et al.

(10) Patent No.: US 8,695,179 B2
(45) Date of Patent: Apr. 15, 2014

(54) HOOK ARTICLE

(75) Inventors: Steven B. Dunn, Beverly Hills, CA (US); Mark A. Hatherill, Beverly Hills, CA (US); Mark G. Tebbe, Ventura, CA (US); Eugene Bae, Culver City, CA (US)

(73) Assignee: Munchkin, Inc., Van Nuys, CA (US)

( * ) Notice: Subject to any disclaimer, the term of this patent is extended or adjusted under 35 U.S.C. 154(b) by 22 days.

(21) Appl. No.: 12/860,647

(22) Filed: Aug. 20, 2010

(65) Prior Publication Data

US 2012/0042486 A1 Feb. 23, 2012

(51) Int. Cl.
*F16B 45/02* (2006.01)
(52) U.S. Cl.
USPC ............... 24/599.1; 24/599.6; 24/601.2
(58) Field of Classification Search
USPC ........ 24/582.11, 582.12, 599.1, 599.6, 601.2, 24/601.4; 294/88.12
See application file for complete search history.

(56) References Cited

U.S. PATENT DOCUMENTS

| 1,594,752 A | | 8/1926 | Pretlove | |
|---|---|---|---|---|
| 2,492,991 A | * | 1/1950 | Hanna | 24/599.6 |
| 5,538,303 A | * | 7/1996 | Dunham | 294/82.31 |
| 5,791,025 A | * | 8/1998 | Maurice et al. | 24/582.11 |
| 5,820,181 A | * | 10/1998 | Le Noach | 294/82.19 |
| 6,606,769 B1 | * | 8/2003 | Harris | 24/599.2 |
| 6,688,259 B2 | * | 2/2004 | Axel | 119/792 |
| 7,114,196 B1 | * | 10/2006 | Cicio | 2/338 |
| 7,125,186 B1 | * | 10/2006 | Stokes | 401/8 |
| D572,573 S | * | 7/2008 | Abels | D8/356 |
| 2002/0179023 A1 | * | 12/2002 | Axel | 119/801 |
| 2004/0074449 A1 | * | 4/2004 | Axel | 119/792 |
| 2004/0143945 A1 | * | 7/2004 | Christianson | 24/600.1 |
| 2005/0028331 A1 | * | 2/2005 | Axel | 24/599.1 |
| 2007/0062013 A1 | | 3/2007 | Mueller | |
| 2008/0104810 A1 | * | 5/2008 | Liang | 24/600.2 |
| 2009/0183347 A1 | * | 7/2009 | Abels | 24/599.6 |
| 2009/0283489 A1 | * | 11/2009 | Holmstrom | 212/251 |

* cited by examiner

*Primary Examiner* — Robert J Sandy
*Assistant Examiner* — David Upchurch
(74) *Attorney, Agent, or Firm* — Robert Z. Evora, Esq.

(57) ABSTRACT

A hook article that is constructed and arranged to facilitate attachment between two or more objects includes a fixed frame member and gate member. The gate member includes a first end that is pivotally hinged to the frame member, a second end movable with respect to the frame member to allow access into an interior space and a handle that is integral with the gate member. The position of the handle facilitates the process of and enables a user to easily open and close the gate member with a single hand, while protecting the fingers of the user against jamming. Upon applying pressure to the handle, the gate member pivotally retracts towards an interior space of the hook article.

19 Claims, 14 Drawing Sheets

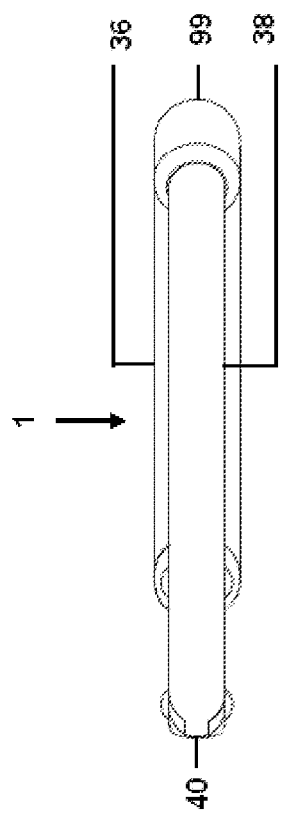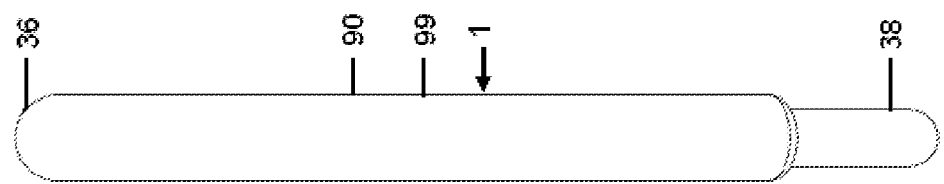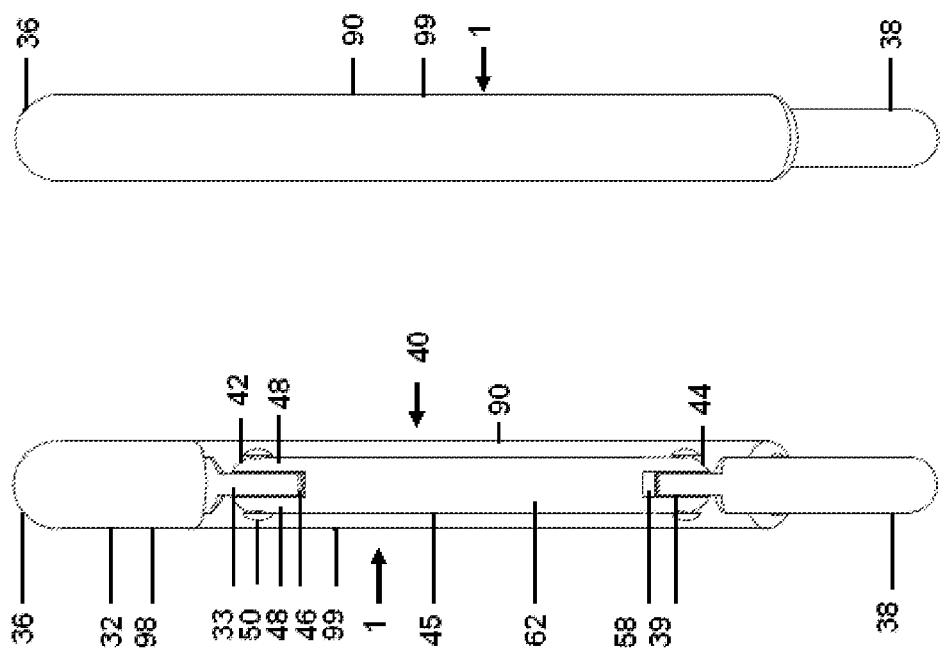

HOOK ARTICLE

BACKGROUND OF THE INVENTION

1. Field of the Invention

This invention pertains to hooks that are used for securing two or more objects together, and more specifically to a hook article having an articulating gate that can be opened by a user without the user's fingers being pinched in the gate mechanism.

2. Description of the Related Technology

Hook mechanisms have long been used in various fields of endeavor to facilitate attachment of two or more objects. For example, conventional stroller hooks, such as that disclosed in U.S. Pat. No. 5,143,335, are simple devices integrally formed with the handlebar of a stroller to permit various items to be hung from a child's stroller. Although they have a hook for holding various articles, such as clothing and purses, such devices do not include any mechanism for ensuring that the article being supported by the hook is not accidentally released from the hook mechanism.

Modified conventional fasteners have recently been proposed to facilitate attachment of various articles to a stroller bar. For example, U.S. Patent Application Publication No. 2009/0183347 discloses a specially modified carabiner adapted to be hung on a stroller handle. Although the device includes an articulating gate for securing one or more items within its C-shaped frame, the gate can be difficult to open and close, particularly when the user's hands are otherwise occupied with transferring items to the modified carabiner while simultaneously pushing the stroller and/or attending to a child. Additionally, the user's fingers are frequently caught and pinched between the frame and articulating gate. The operation of such a device is significantly hindered by the lack of a user friendly handle component capable of protecting a user's fingers during operation and facilitating the process of opening and closing the articulating gate.

Accordingly, there exists a need in this area of technology to develop an improved hook article that may address the shortcomings of the prior art. To this end, the present invention is directed to a hook article capable of securing an item therein and having a handle integral with an articulating gate so as to protect a user's fingers during operation and facilitate the process of opening and closing the articulating gate.

SUMMARY OF THE INVENTION

Accordingly, it is an object of the invention to provide a hook article having a handle that is integral with an articulating gate for facilitating the process of opening and closing the pivoting gate.

In order to achieve the above and other objects of the invention, a hook article according to a first aspect of the invention includes a body defining an enclosed interior space. The body includes a frame member, a gate member and a handle. The gate member has a first end pivotally hinged to the frame member and a second end movable with respect to the frame member allowing access into the interior space. The handle facilitates the pivotal retraction of the gate member towards the interior space and is integral with the gate member.

A hook article capable of being attached to a child carrier according to a second aspect of the invention has a body defining an enclosed interior space. The body includes a frame member, a gate member and a handle. The gate member has a first end pivotally hinged to the frame member and a second end movable with respect to the frame member allowing access into the interior space. The handle, integral with the gate member and positioned adjacent to the second end, includes a hole adapted for receiving a user's finger to facilitate the pivotal retraction of the gate member towards the interior space.

A method for using a hook article according to a third aspect of the invention involves providing a hook article having a body defining an enclosed interior space. The body includes a frame member, a gate member pivotally hinged to the frame member, wherein an end of the gate member is movable with respect to the frame member allowing access into the interior space and a handle integral with the gate member. The method further involves simultaneously and pivotally retracting the handle and the gate member towards the interior space to create an opening between the gate member and the frame member, inserting an article to be held into the opening and releasing pressure on the handle to induce the hook article to assume a closed position.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 is a left side view of the hook article of FIG. 1 showing the gate member.

FIG. 7 is a right side view of the hook article of FIG. 1.

FIG. 8 is a bottom view of the hook article of FIG. 1.

FIG. 9 is a top view of the hook article of FIG. 1.

DETAILED DESCRIPTION OF THE PREFERRED EMBODIMENT(S)

Figure 1:
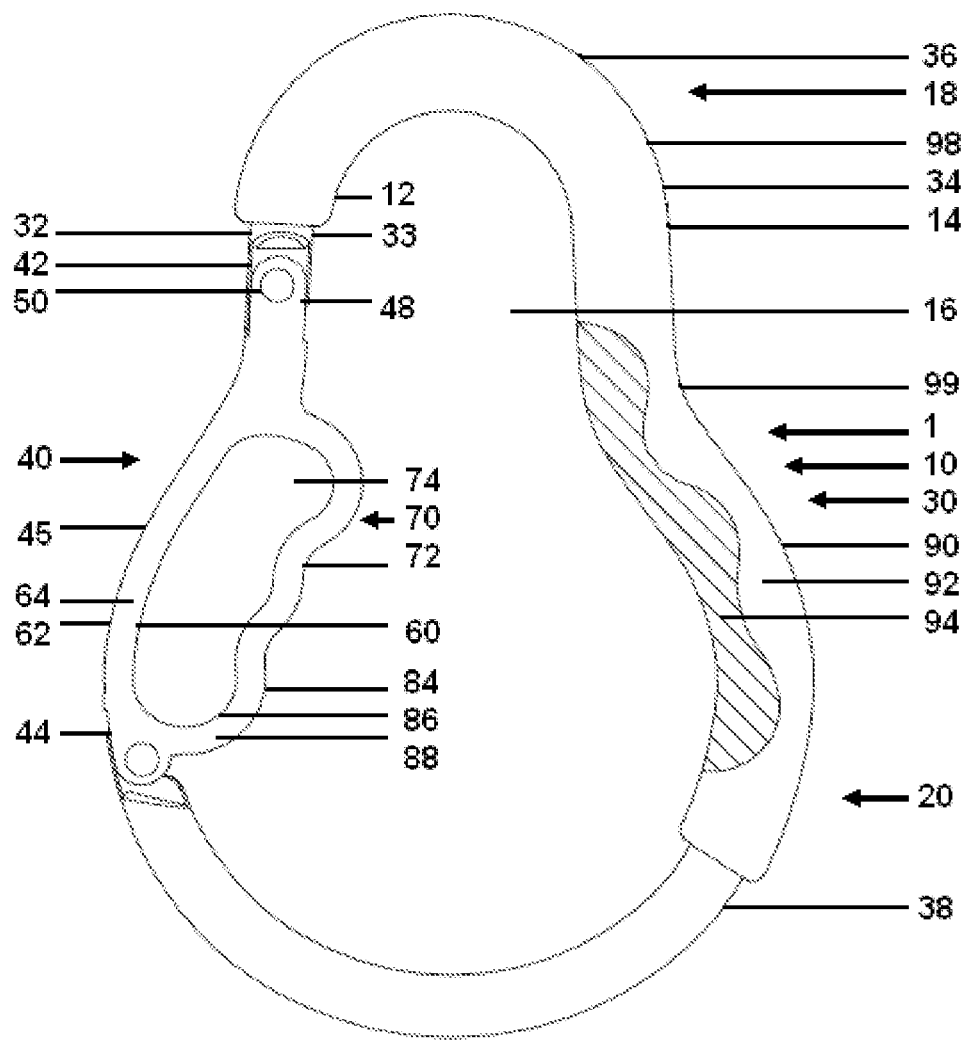
FIG. 1 is a front view of an exemplary hook article of the present invention, wherein the gate member is oriented in a closed position.
Figure 2:
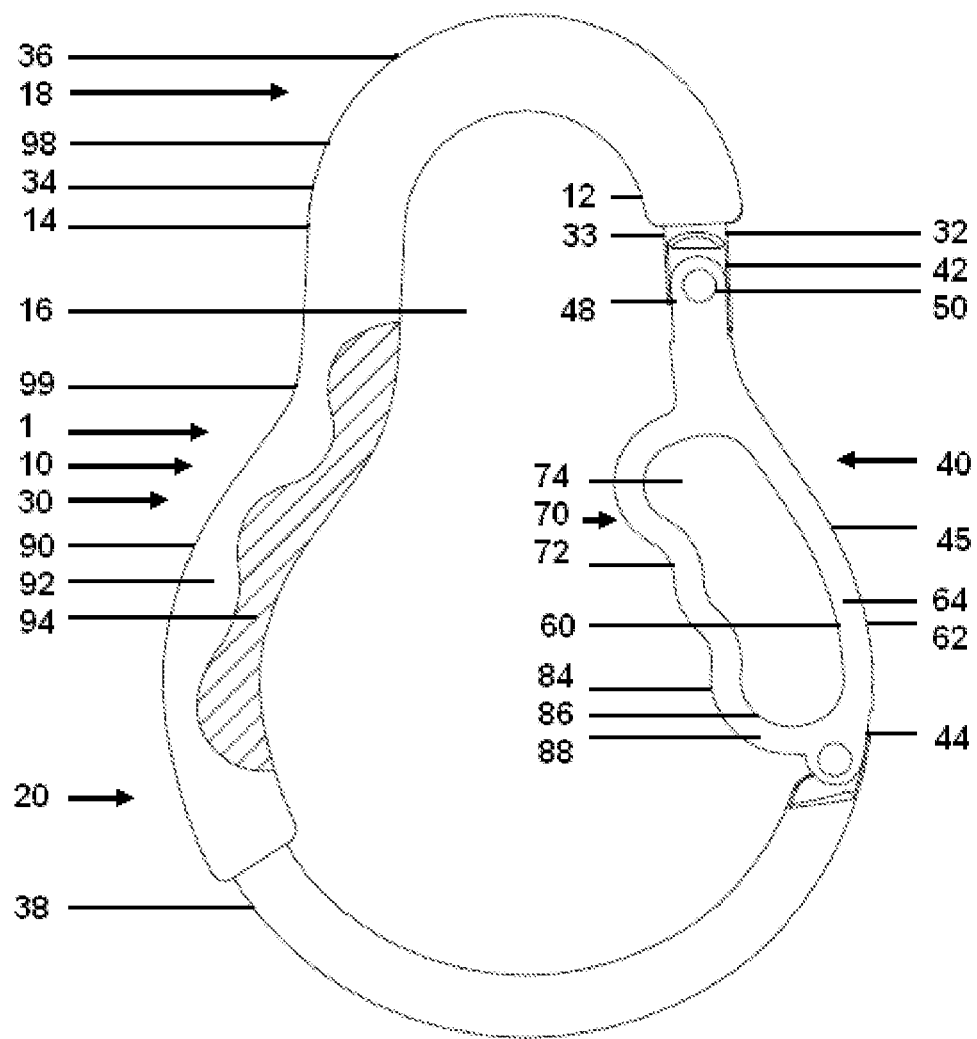
FIG. 2 is a rear view of the hook article of FIG. 1.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation. Further, although certain methods are described with reference to certain steps that are presented herein in certain order, in many instances, these steps can be performed in any order as may be appreciated by one skilled in the art, and the methods are not limited to the particular arrangement of steps disclosed herein.

It must be noted that as used herein and in the appended claims, the singular forms "a", "an", and "the" include plural references unless the context clearly dictates otherwise. Additionally, the terms "a" (or "an"), "one or more" and "at least one" can be used interchangeably herein. Moreover, the terms "comprising", "including", and "having" as presented herein may be used interchangeably.

For purposes of the present invention, a "child carrier," as used herein, may include a stroller, carriage, buggy, or other device for supporting and/or transporting a child.

Furthermore, unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

The present invention is directed to a novel hook article 1 and a method for using the hook article 1 in association with a child carrier. The technology may be predicated upon the importance of providing a versatile hook article adapted for attaching to a child carrier and incorporating a handle that facilitates the process of opening and closing a pivotal gate member and prevents a user's fingers from being caught or pinched by the pivoting gate. Hook article 1 has a body 10 defined by a fixed frame member 30 and a pivoting gate member 40. Integral with gate member 40 is one or more handles 70. In an exemplary embodiment, hook article 1 is adapted to be removably hooked onto a handlebar or frame member of a child carrier and can attach one or more articles, such as a diaper bags, purses, hand bags, backpacks and shopping bags thereto. Hook article 1 may also be used for a variety of different applications to facilitate the attachment of a plurality of different objects.

Referring now to the drawings, wherein like reference numerals designate corresponding structure throughout the views, and referring in particular to the exemplary embodiment shown in FIGS. 1-9, when gate member 40 is oriented in a closed position relative to fixed frame member 30, body 10 of hook article 1 has a continuous outer surface 14 and a continuous inner surface 12 that defines an enclosed interior space 16 of hook article 1. Body 10 can have any shape, size or configuration suitable for retaining one or more articles within interior space 16. Exemplary configurations of body 10 when hook article 1 is oriented in a closed configuration can include but are not limited to a circle, oval, pear shape or combination thereof. Additionally, body 10 can also be constructed from any material that endows hook article 1 with sufficient load bearing capability to retain multiple articles. Preferably, hook article 1 is constructed from durable and high strength materials, such as plastics, metals or metal alloys. Exemplary materials can include aluminum, titanium, stainless steel, alloys thereof, or combinations thereof.

In the exemplary embodiment of FIGS. 1-5, body 10 has an elongated pear shape including a first body end 18 and an opposing second body end 20. As shown, first body end 18 is defined by a first frame section 32 second frame section 34, third frame section 36, first gate end 42, or combinations thereof, and is configured to be securely hung from a component of a child carrier, such as a handlebar or frame member. In one embodiment, first frame section 32 as well as first gate end 42 are spaced apart from and positioned substantially parallel to second frame section 34. A third frame section 36 having a curved configuration connects first and second frame sections 32, 34.

In another embodiment, first frame section 32 and/or first gate end 42 is curved with an inner concave surface facing the inner concave surface of a correspondingly curved second frame section 34. First frame section 32 and/or first gate end 42 as well as second frame section 34 can also be angularly inclined relative to one another, defining an angled or pinched neck region distal from third frame section 36. This configuration allows for entry into as well as localized retention of a child carrier component within first body end 18. First body end 18 therefore can have a curved configuration, arcuate configuration, dome shape, circular shape, semicircular shape, oval shape or combinations thereof adapted for receiving a handlebar or frame member having a rounded or oval cross-sectional configuration. First body end 18 can also have a substantially rectangular or square configuration adapted to conform to a handlebar or frame member having a substantially rectangular or square shaped cross-section. In an exemplary embodiment, the diameter or width defined by the inner surface of first body end 18 is about 30 mm to about 50 mm, preferably about 35 mm to about 45 mm. In an exemplary embodiment, first body end 18 is sized and adapted to removably receive the handlebars and/or frame members of standard child carriers, shopping carts or wheelchairs.

A second body end 20 spaced apart from and positioned opposite to first body end 18 can be used to retain and hold one or more articles, such as diaper bags, hand bags, purses, backpacks and shopping bags by the handles in a load bearing manner. Second body end 20 is defined by a fourth frame section 38 and/or a second gate end 44. Fourth frame section 38 and/or second gate end 44 can be configured to have an enlarged, curved, bulbous configuration sufficient to retain a plurality of articles by their handles. Second body end 20, can therefore have a curved configuration, arcuate configuration, circular shape, semicircular shape, oval shape, rectangular shape or combinations thereof adapted for retaining one or more articles.

As shown in FIGS. 1-5, the width or diameter defined by an inner surface of second body end 20 is larger than the diameter or width defined by the inner surface of first body end 18. In an exemplary embodiment, second body end 20 has an inner diameter or inner width of about 80 mm to about 100 mm, preferably about 85 mm to about 95. As shown in FIGS.

1-5, second body end 20 can have a shallow radius of curvature of about 45 mm to about 65 mm that facilitates insertion and removal of one or more articles through an opening between fourth frame section 38 and second gate member 40. In an alternative embodiment, second body end 20 can have a larger radius of curvature of about 50 mm to about 60 mm relative to the first body end 18 to ensure the retention of one or more articles within hook article 1.

In an exemplary embodiment, the pear shaped hook article 1 of FIGS. 1-5 has a length of about 150 mm to about 180 mm, a width of about 100 mm to about 125 mm and a thickness of about 10 mm to about 18 mm. First body end 18 has a semicircular concave configuration with an inner diameter of about 30 mm to about 50 mm, and second body end 20 has a semicircular convex configuration with an inner diameter of about 80 mm to 100 mm.

Figure 3:
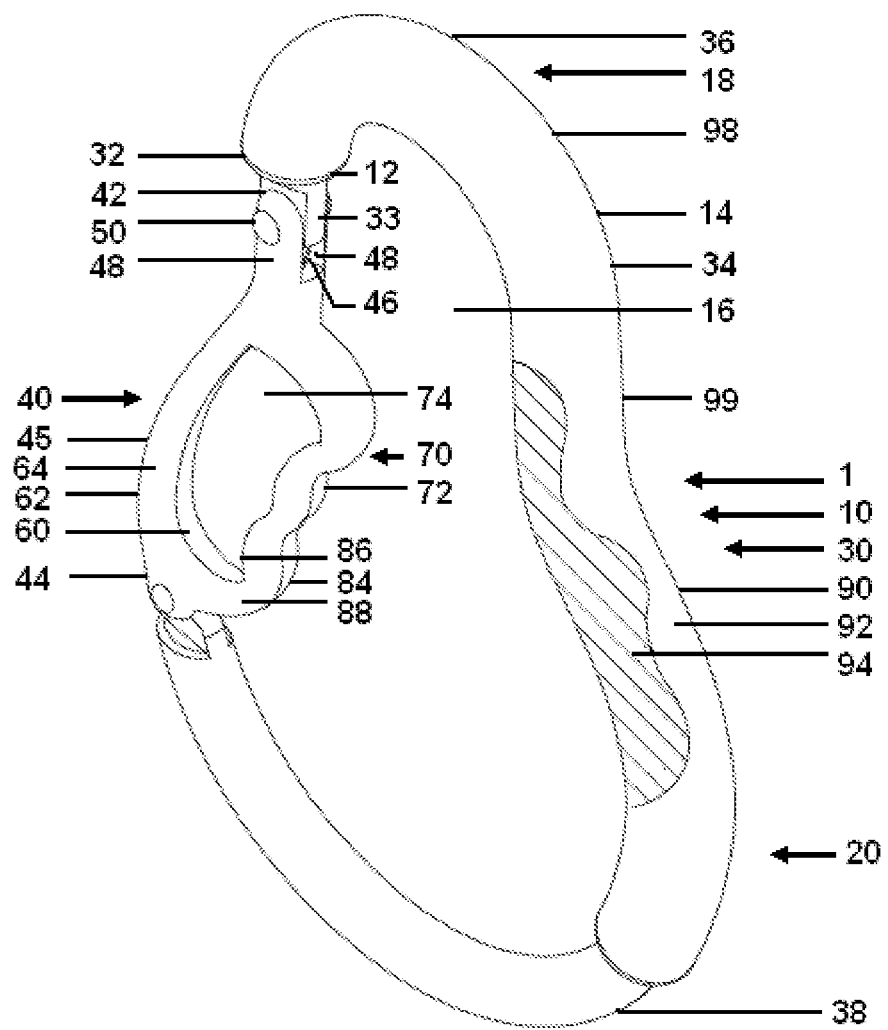
FIG. 3 is a perspective view of the hook article of FIG. 1.
Figure 4:
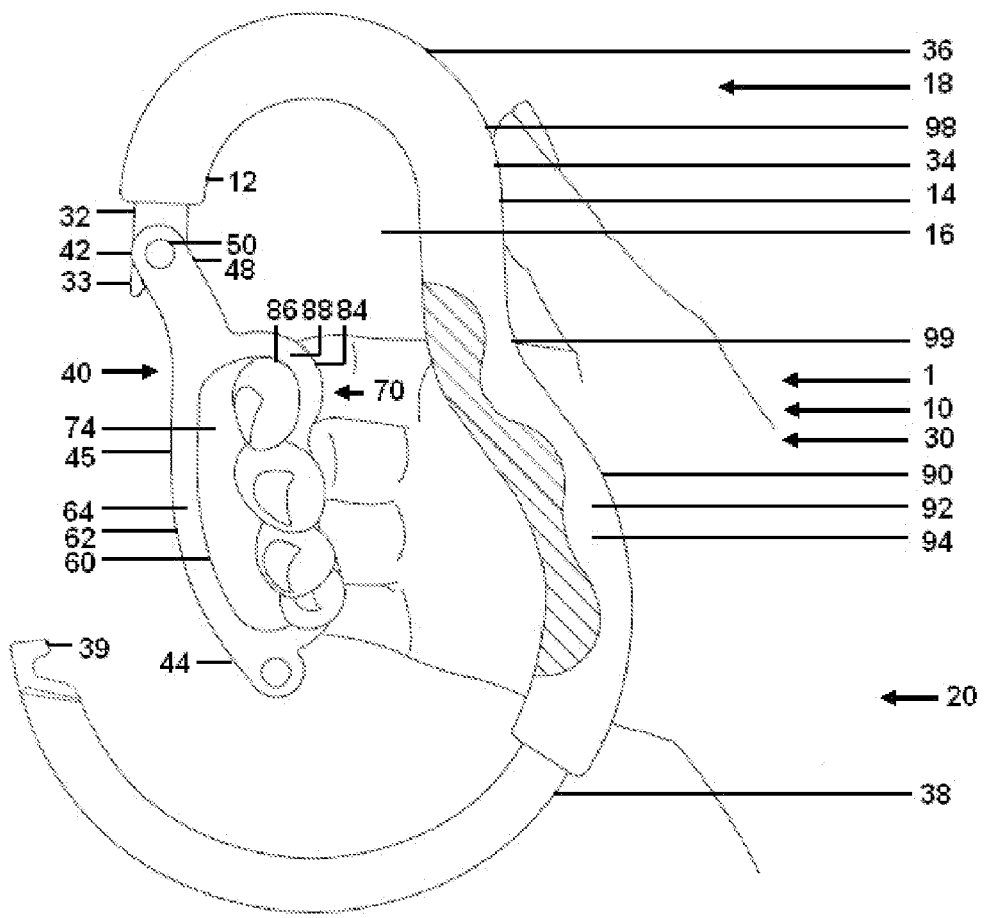
FIG. 4 shows the hook article of FIG. 1 wherein the gate member is retracted and oriented in an open position.
Figure 5:
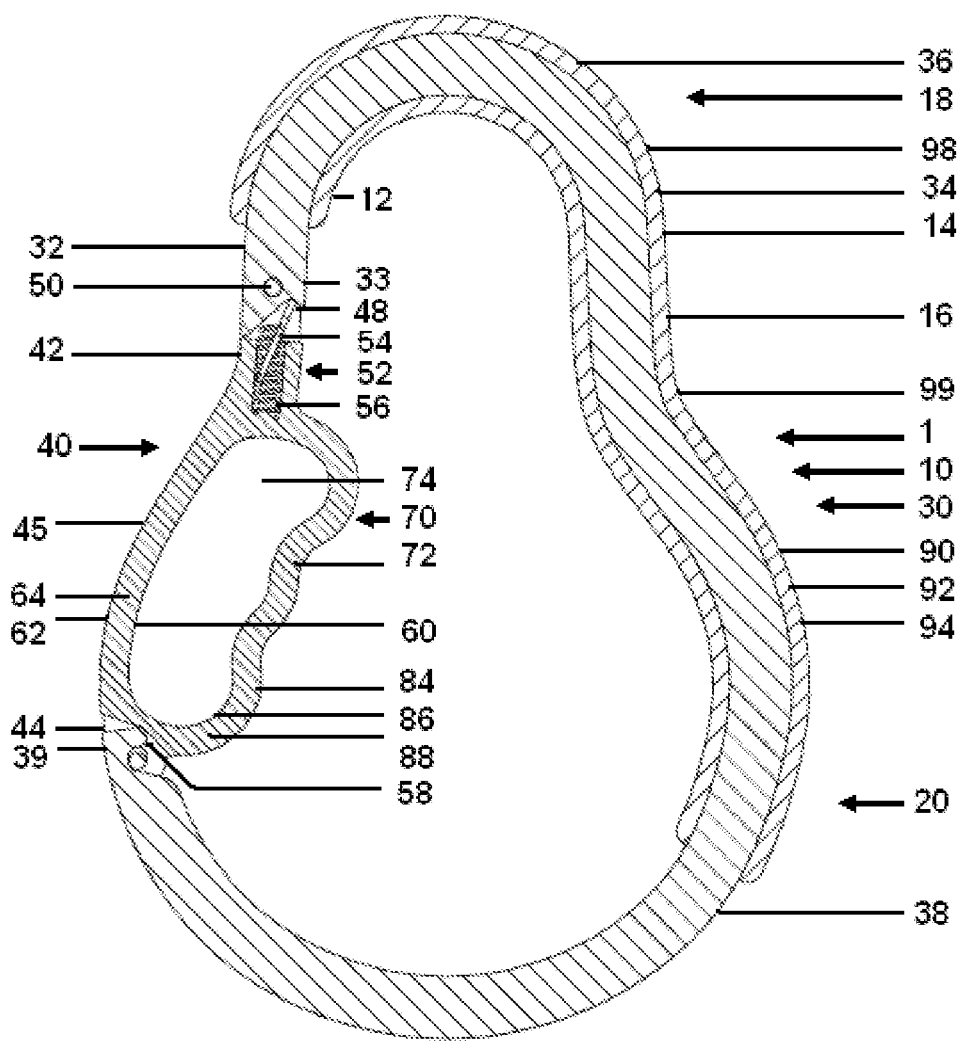
FIG. 5 is a cross-sectional view of the hook article of FIG. 1.

As best shown in FIGS. 3-5, gate member 40 is pivotally attached to fixed frame member 30 to allow access into interior space 16 of body 10. Gate member 40 can have any suitable size or configuration adapted to facilitate the insertion of one or more articles within hook article 1 and attach hook article 1 onto a handlebar of a child carrier. Preferably, gate member 40 has a sufficient length to create a wide opening when pivotally retracted. In an exemplary embodiment, gate member 40 can be about 80 mm to about 120 mm, preferably about 70 mm to about 110 mm.

First gate end 42 has a first slot 46 positioned on an end thereof, defined by two side arms 48, that is configured to receive first frame section end 33. A pin 50 positioned through side arms 48 and first frame section end 33, pivotally couples gate member 40 relative to fixed frame member 30. Operatively associated with pin 50 is a spring assembly 52 that functions to bias gate member 40 towards a closed position. In one embodiment, spring assembly 52 includes a leaf spring 54 that is directly attached to pin 50 and/or a portion of first frame section 32 at one end and a coiled spring 56 at the opposite end. Leaf spring 54 and/or coiled spring 56 is embedded in gate member 40 at an angle relative to pin 50 such that when the gate member 40 is retracted and tips towards interior space 16, spring assembly 52 exerts an opposing force on gate member 40 urging gate member 40 to return to its initial closed position. In an alternative embodiment spring assembly 52 can be configured as a leaf spring coiled about the circumference of pin 50.

As shown in FIGS. 4-5, second gate end 44 includes a second slot 58 positioned on a front face of an end thereof. Second slot 58 is configured to removably receive a latch 39 located at an end of fourth frame section 38. As shown in FIG. 4, latch 39 can be configured as a hook with a substantially flattened head. When latch 39 is positioned within second slot 58, the hook article 1 is closed. In this position, gate member 40 and fourth frame section 38 forms a portion of the continuous perimeter of hook article 1.

As shown in FIGS. 1-6, first gate end 42 is connected to second gate end 44 by a middle gate section 45. In one embodiment, middle gate section 45 can have a circular or oval cross-section, the diameter of which can be less than the cross-sectional diameter of first gate end 42 and second gate end 44. An exemplary diameter of middle gate section 45 is about 5 mm to about 15 mm, and an exemplary diameter of first gate end 42 and second gate end 44 is about 10 mm to about 15 mm.

One or more handles 70 integral with one or more body portions of the gate member 40 functions to facilitate opening and closing of gate member 40 and protect a user's fingers from being caught between second gate end 44 and fourth frame section 38. In an exemplary embodiment, handle 70 can be positioned or formed on, protrude from, form part of, or be defined in one or more portions of a gate member body or combinations thereof. To enhance leverage, handle 70 is preferably positioned adjacent to second gate end 44. Alternatively, handle 70 can be positioned along middle gate section 45 or adjacent to first gate end 42.

Handle 70 can also be positioned so as to span the entire length of or cover one or more regions of gate member 40. For example, handle 70 may extend across the length of second gate end 44 and middle gate section 45, wherein one end of handle 70 is attached to a portion of gate member 40 adjacent to or adjoining second gate end 44 and the opposite end of handle 70 is attached adjacent to or adjoining middle gate section 45.

Figure 10:
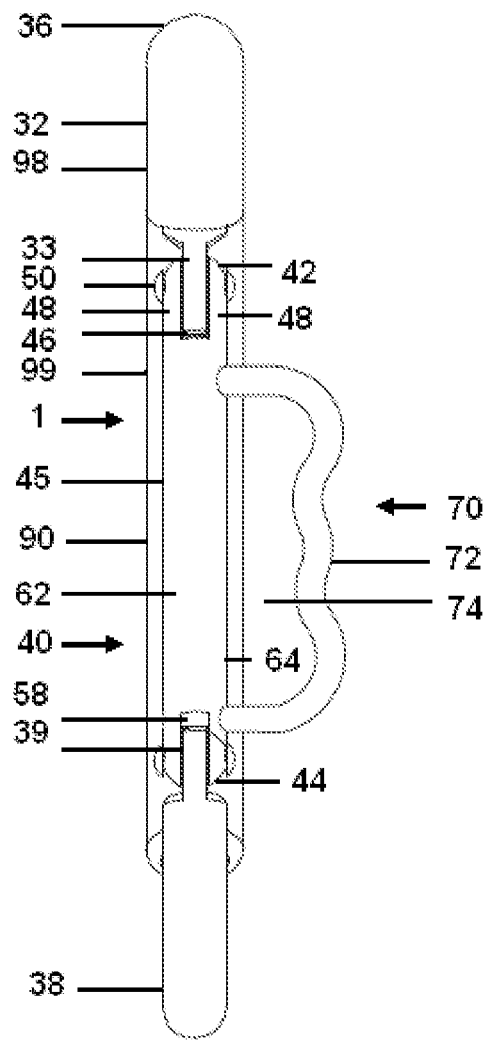
FIG. 10 is a side view of a second hook article embodiment showing a handle extending from a side surface of the gate member.
Figure 11:
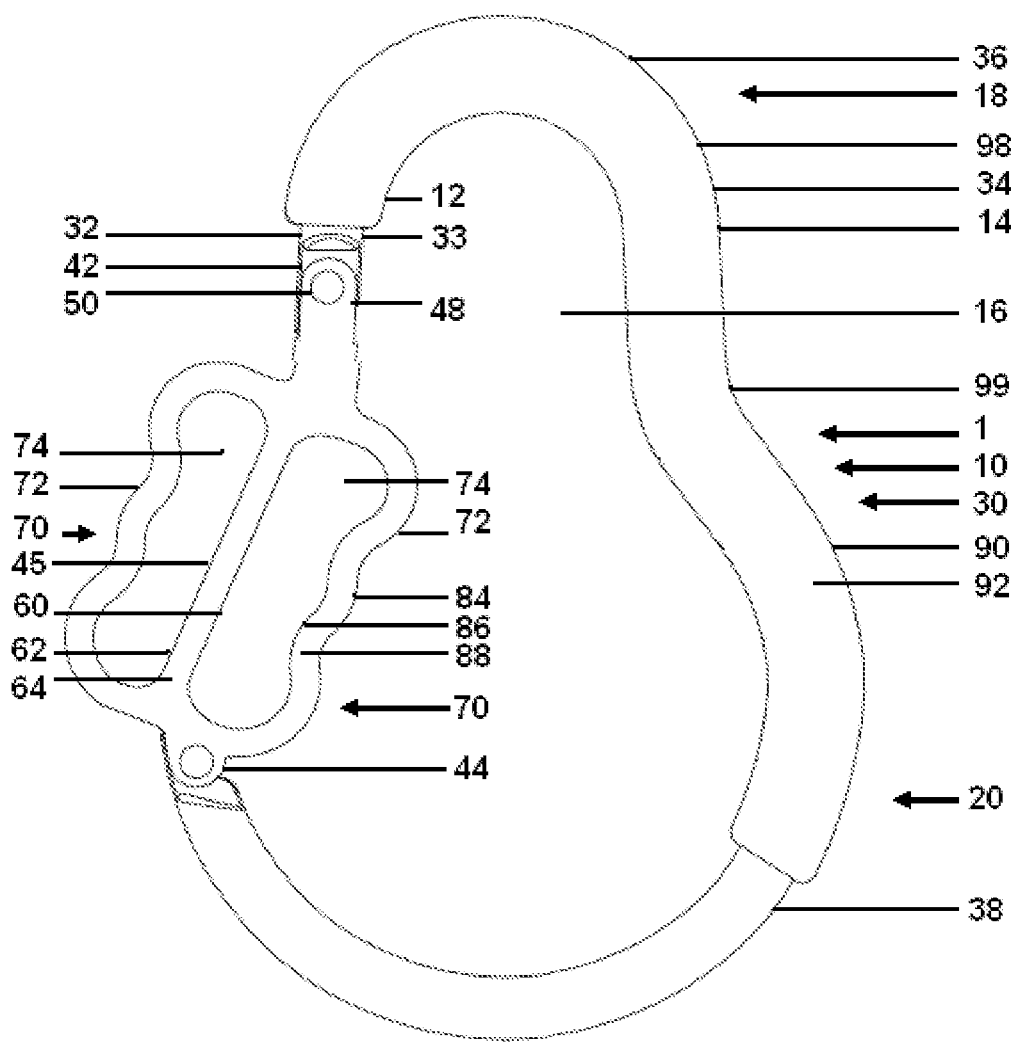
FIG. 11 is a front view of a third hook article embodiment having two handles.

Handle 70 can be positioned on an inner face 60, outer face 62 or side faces 64 of gate member 40. As shown in FIGS. 1-6, gate member 40 is preferably positioned on and protrudes from a portion of gate member inner face 60, creating a self-contained and ergonomic design that facilitates retraction of gate member 40. In another embodiment shown in FIG. 10, handle 70 is positioned on and protrudes from a gate member side face 64 to prevent obstruction of and to free the interior space 16 within hook article 1 for retaining a plurality of articles. As shown in FIG. 11, hook article 1 can also have two handles 70. A first handle 70 can be positioned on and protrude from gate member inner face 60 for retracting gate member 40, and a second handle 70 can be positioned on and protrude from gate member outer face 62, functioning as a hand grip for holding hook article 1.

Handle 70 can include one or more handle members 72 and can have any shape, size or configuration suitable for assisting a user in pivotally retracting gate member 40. In one embodiment, one or more handle members 72 alone or in combination with one or more surfaces of gate member 40 can be used to construct a handle 70 having a closed configuration that defines one or more holes 74. The portion of handle 70 and/or gate member 40 defining hole 74 can have any geometric configuration suitable for receiving one or more of a user's fingers. Exemplary hole configurations include a circle, oval, rectangle, square, triangle or combinations thereof.

As shown in the exemplary embodiment of FIG. 1, handle 70 has a closed configuration and includes an elongated handle member 72 attached to gate member inner face 60. In this embodiment, one end of handle member 72 is attached to second gate end 44 and the opposite end of handle member 72 is attached to middle gate section 45, wherein handle member 72 extends between second gate end 44 and middle gate section 45. Alternatively, the ends of handle member 72 may be positioned adjacent to or adjoin any surface of gate member 40, including second gate end 44, middle gate section 45 and first gate end 42. As shown, handle member 72 and gate member 40 defines an elongated hole 74 adapted for receiving a plurality of fingers. In this embodiment, hole 74 can have a length of about 40 mm to about 80 mm, preferably about 50 mm to about 70 mm, and the width of hole 74 can be about 10 mm to about 30 mm, preferably, 15 mm to about 25 mm.

Figure 12:
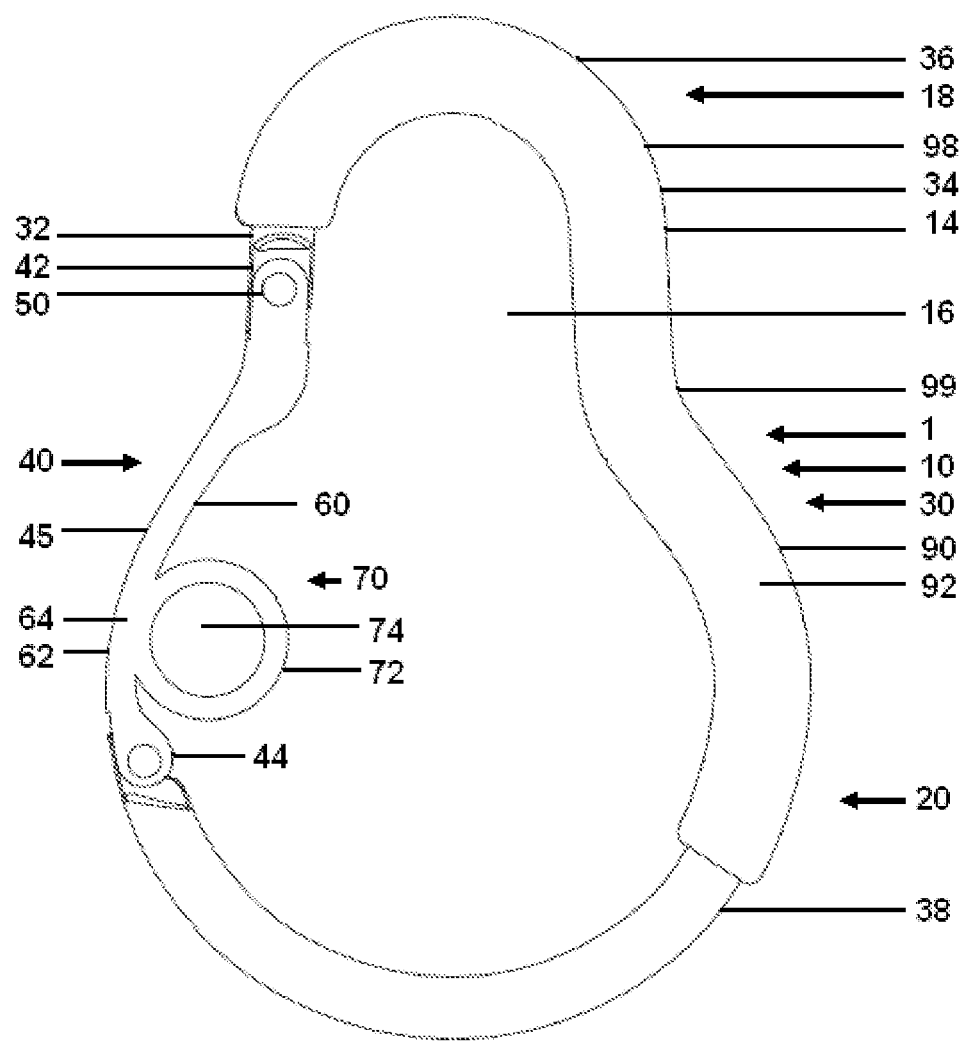
FIG. 12 is a front view of a fourth hook article embodiment showing a handle member with a finger hole defined therein.

An alternative closed handle embodiment is shown in FIG. 12, wherein handle member 72, attached to an inner face 60 of gate member 40 adjacent to second gate end 44, has a closed circular configuration. The central hole 74 defined in handle member 72 is sized and adapted to receive one or two fingers. In this embodiment, hole 74 can have a diameter of about 10 mm to about 30 mm, preferably about 15 mm to about 25 mm.

Figure 13:
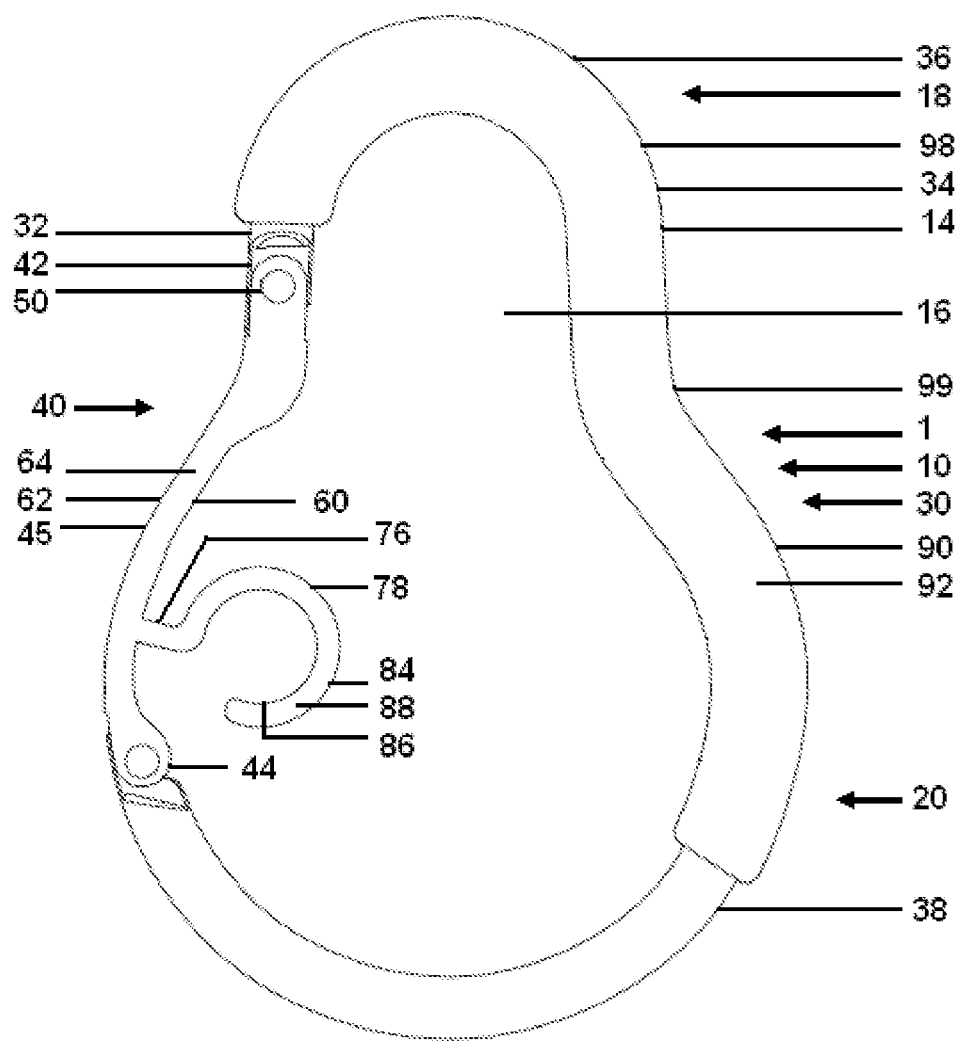
FIG. 13 is a front view of a fifth hook article embodiment showing a handle member having an open configuration.

Alternatively, one or more handle members 72 alone or in combination with one or more surfaces of gate member 40 can be used to construct a handle having an open configuration. As shown in FIG. 13, handle 70 is constructed from a stem like first handle member 76 attached at one end to gate member inner face 60. At an opposite end, first handle member 76 is integrally connected to an open ended circular or oval second handle member 78.

Figure 14:
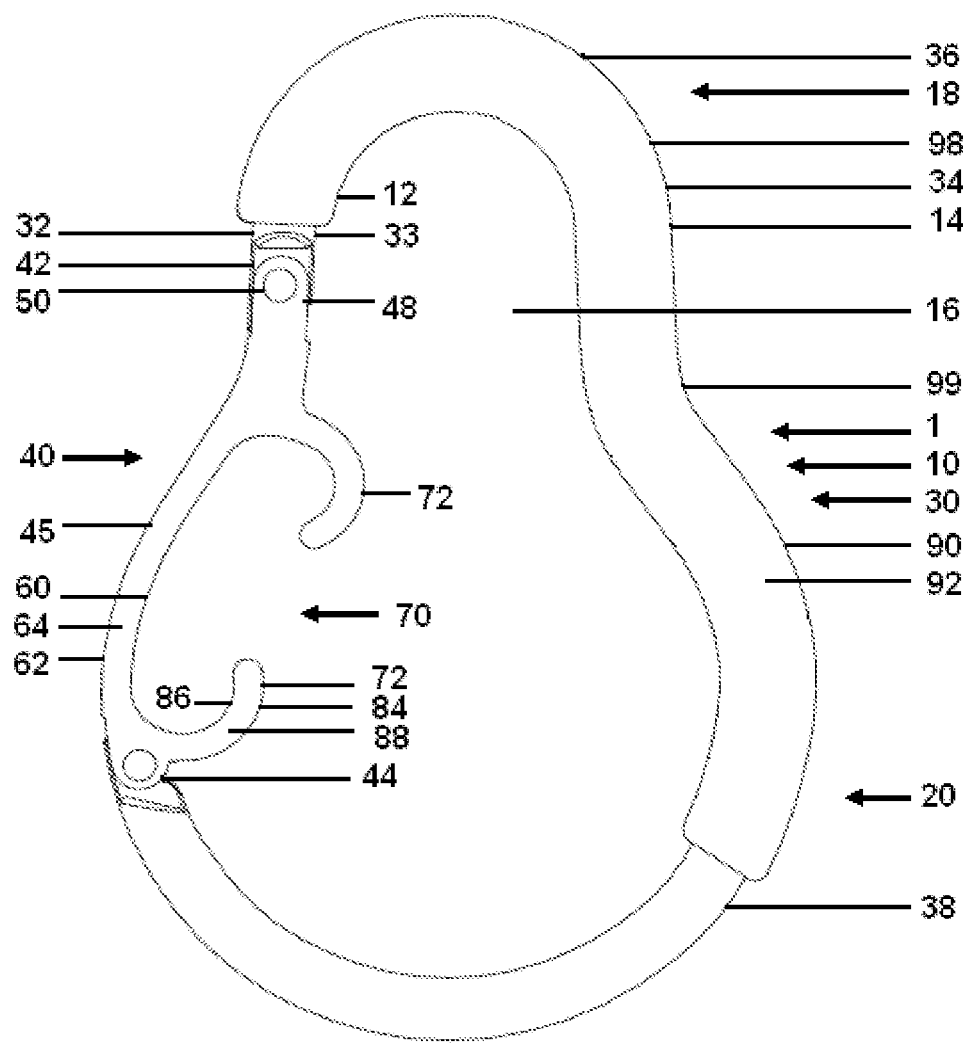
FIG. 14 is a front view of a sixth hook article embodiment showing two curved handle members having an open configuration.

In the embodiment of FIG. 14, handle 70 includes two or more oppositely curved semi-circular handle members 72 with facing concave and convex inner surfaces that collectively form an open handle structure. In this embodiment, the two handle members 72 can be spaced apart from one another by about 20 mm to about 50 mm in order to comfortably retain a plurality of fingers. In another embodiment, handle 70 may have only one handle member 72 having the same curved, semi-circle structure as shown in FIG. 14 that is sized to receive one or two fingers.

Figure 15:
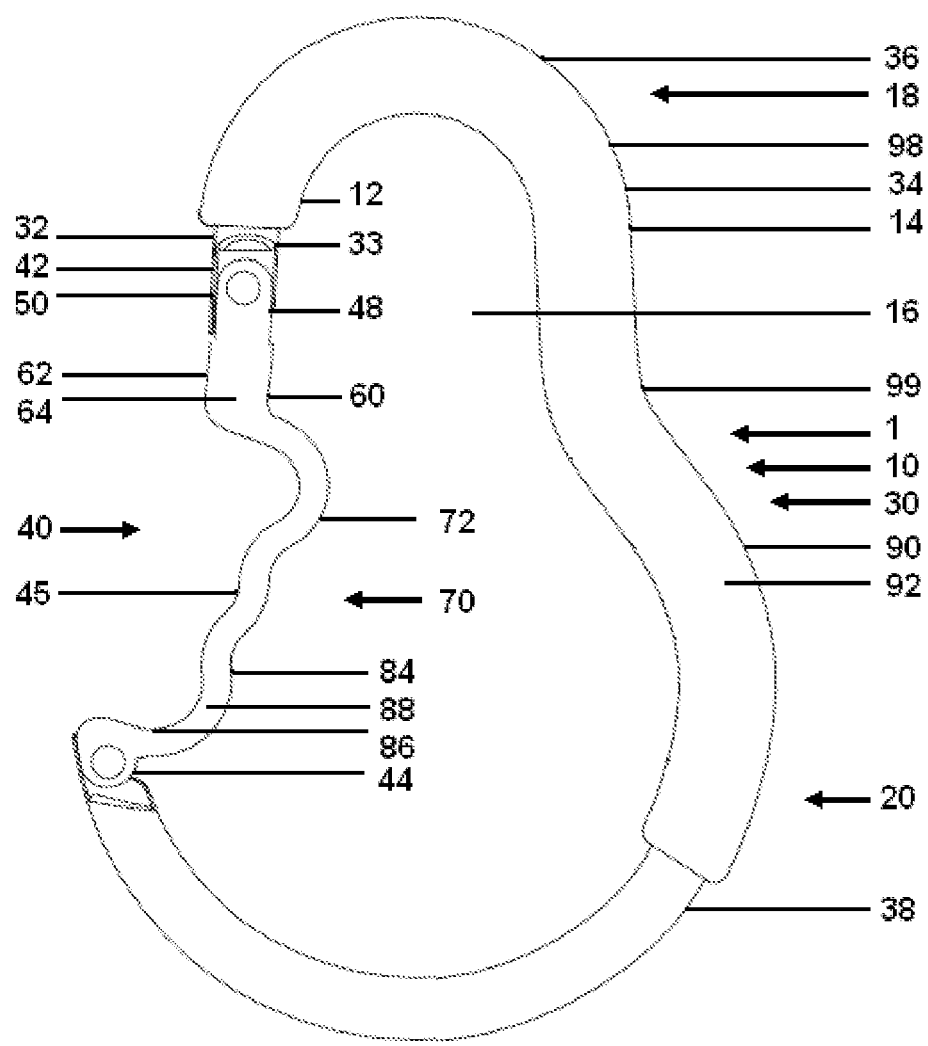
FIG. 15 is a front view of a seventh hook article embodiment showing a handle having an opening configuration, wherein the handle member is inset with respect to the ends of the gate member.

FIG. 15 shows another open configuration handle 70, wherein handle member 72 is integral with and formed as part of gate member 40. In this embodiment, handle member 72 is preferably inset with respect to first gate end 42 and/or second gate end 44 in order to receive and prevent a user's fingers from being inadvertently caught or pinched by second gate end 44 and fourth frame section 38. Preferably, handle member 72 has a length of about 40 mm to about 80 mm, preferably about 50 mm to about 70 mm.

Figure 16:
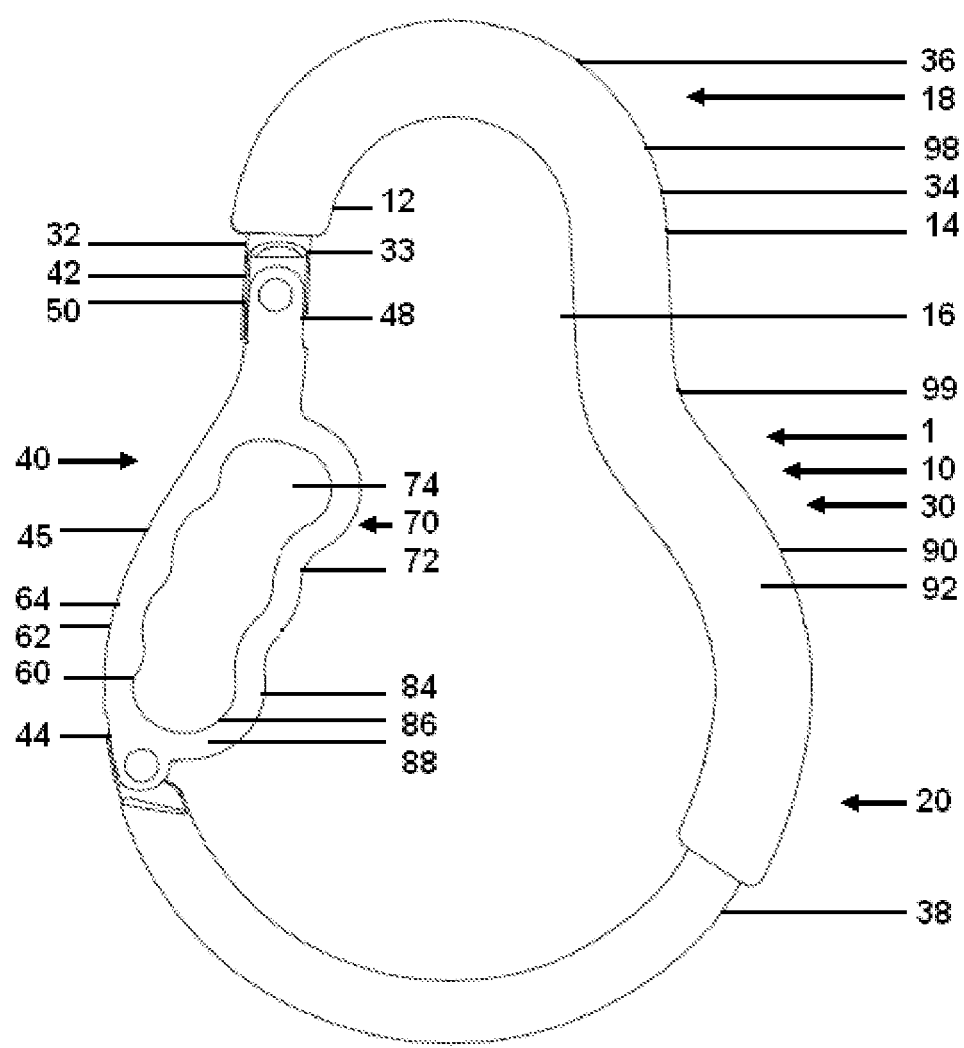
FIG. 16 is a front view of an eight hook article embodiment showing a gate member and handle member with opposing inner surfaces having a scalloped configuration.

Handle member 72, defined by an inner surface 84, outer surface 86 and side surfaces 88, can have any suitable configuration. One or more handle member outer surfaces 86 can be contoured to receive two or more fingers to facilitate opening and closing gate member 40. Handle member inner surface 84 can also be contoured to function as a hand grip by which a user can hold hook article 1. As shown in FIGS. 1-5, exemplary contours include a scalloped or wave like shape. Alternatively, handle member inner and/or outer surfaces 86, 88 can have a continuously curved configuration, linear configuration, or combinations thereof. As shown in FIG. 16, gate member inner face 60 can also have a scalloped or wave like contour that functions as a hand grip for receiving two or more fingers. In the embodiments shown in FIGS. 1-5, handle member 72 protrudes from gate member inner face 60 towards inner space 16 adjacent to second gate end 42. This protrusion can assist in the retention of a child carrier component positioned adjacent to first body end 18.

Hook article 1 optionally includes one or more sleeves 90 that can cover one or more regions of body 10. Sleeve 90 can be constructed from any suitable material that creates a non-slip surface. Exemplary materials include plastic, elastomeric overmold, such as rubber, or combinations thereof. In an exemplary embodiment, sleeve 90 can include one or more substantially smooth non-slip surfaces 92 and/or one or more textured regions 94 that functions as a hand grip for holding hook article 1. Textured region 94 can include a plurality of protrusions, such as nubs or ridges, that inhibits slipping and enhance a user's grip.

Figure 19:
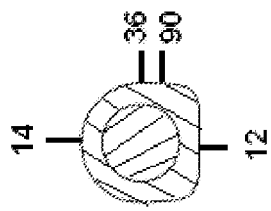
FIG. 19 is a cross-sectional view of the hook article of FIG. 17 taken at line A-A showing an alternative sleeve having a widened flange configuration.
Figure 18:
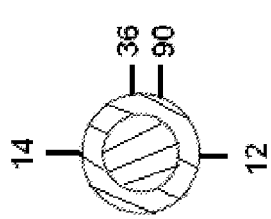
FIG. 18 is a cross-sectional view of the hook article of FIG. 17 taken at line A-A showing a sleeve having a circular configuration.

Sleeve 90 can have any suitable configuration that provides a hand grip and/or facilitates the attachment of an article to a child carrier. In one embodiment, sleeve 90 has a concentric geometry with respect to one or more portions of body 10. For example, sleeve 90 can have a concentric cylindrical configuration corresponding to the cylindrical shape of fixed frame member 30 and gate member 40, as shown in FIG. 18. In one embodiment, the walls of cylindrical sleeve 90 has a thickness of about 1 mm to about 4 mm. Alternatively, sleeve 90 can have a different shape or configuration than body 10. For example, one or more inner or outer surfaces of sleeve 90 can have a widened flange like structure or shape to facilitate gripping, as shown in FIG. 19.

Sleeve 90 can be positioned any where along the length of body 10, including first body end 18, second body end 20, gate member 40, the region opposite gate member 40 or combinations thereof. In one embodiment, a first sleeve portion 98 positioned on first body end 18 inhibits hook article 1 from moving and rotating relative to a component on which it is hung, such as a child carrier. In one embodiment shown in FIGS. 17-18, sleeve 90 has a circular cross-section. In another embodiment shown in FIGS. 17 and 19, an inner surface of first sleeve portion 98 adjacent to interior space 16 can be configured to have a widened flange configuration and extended surface area that facilitates gripping, partially wraps around or otherwise enhances the grip region between hook article 1 and a child carrier component. As shown, the widened inner surface of first sleeve portion 98 may have a substantially planar configuration suitable for gripping a flat surface or alternatively a concave configuration that mimics the curvature of and is adapted to securely grip the contours of a curved handlebar of a child carrier.

A second sleeve portion 99 can be positioned on a side of hook article 1, preferably a side opposite gate member 40. The outer surface of second sleeve portion 90 can be configured to have an outer surface including an elongated flat region with a round or oval end that conforms to the shape of a user's thumb. An inner surface of second sleeve portion 90 can also include one or more elongated textured regions 94 suitable for functioning as a hand grip. In an exemplary embodiment, this textured region 94 is about 70 mm to about 90 mm in length and about 10 mm to about 15 mm in width.

Figure 17:
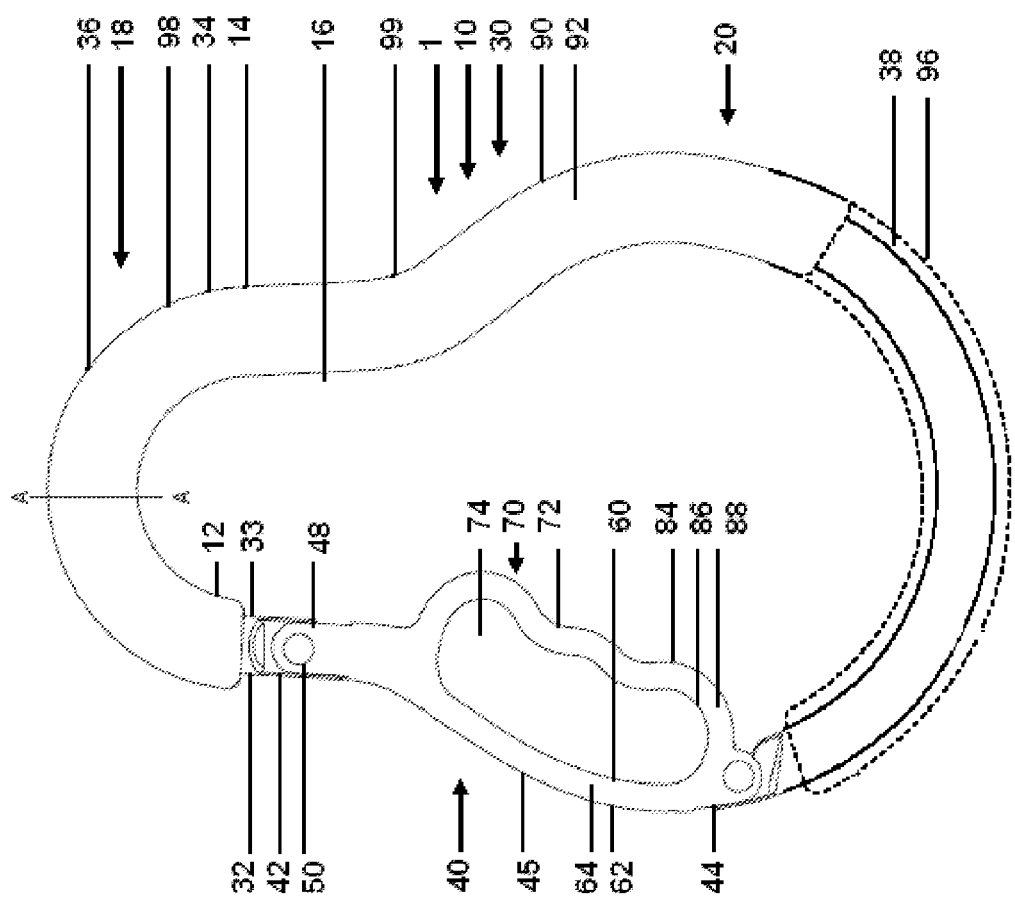
FIG. 17 is a front view of a ninth hook article embodiment having an extended sleeve.

Sleeve 90 can further include a third sleeve portion 96, as indicated by the dotted lines in FIG. 17, such that a portion of sleeve 90 can be positioned over fourth fixed frame section 38 to provide a non-slip surface that enhances the retention of multiple articles within hook article 1. Additionally, a portion of sleeve 90 can also cover gate member 40, handle 70, handle member 72 or combinations thereof.

Highly versatile, hook article 1 provides a number of advantageous features that are particularly relevant for use with a child carrier. By virtue of positioning handle 70 on gate member 40, preferably gate member inner face 60, hook article 1 can be operated with one hand to enable safe and easy access into interior space 16. Handle 70 also function to prevent a user's fingers from becoming pinched or caught between articulating gate member 40 and fixed frame member 30. Additionally, first body end 18 can be configured and adapted to securely grip and retain a wide range of child carrier handlebars or frame members while second body end 20 is configured to retain multiple articles within interior space 16. Constructed from a lightweight, durable and strong material, hook article 1 enables the retention of multiple heavy articles without breaking. Furthermore, sleeve 90 functions to inhibit hook article 1 from substantially rotating or moving relative to the child carrier handlebars and/or frame members.

Hook article 1 can be used for a wide variety of applications involving the retention and fastening of two or more articles. For example, hook article 1 can be used to attach diaper bags, shopping bag, grocery bags, backpacks, hand bags, purses, other carry bags or combinations thereof to any component, preferably a hook, frame member or handlebar of a motor vehicle, shopping cart, wheelchair, or child carrier.

In an exemplary embodiment, the method of the present invention involves attaching hook article 1 to a frame member or handlebar of a stroller using one hand. The palm of a user's hand abuts an outer surface of fixed frame member 30 that is positioned substantially opposite to gate member 40, and the user's fingers extend into handle 70, namely hole 74 or an open space partially defined by one or more handle members 72 and/or gate member 40. One or more of the user's fingers can engage a scalloped contour of handle member outer surface 86. To open hook article 1, the user draws his fingers against handle member 72 and towards the palm, squeezing handle 70 in a trigger like fashion inducing gate member 40 to simultaneously and pivotally retract towards interior space 16. As second gate end 44 is retracted towards interior space 16, the frame member or handlebar of a stroller can be inserted through the opening between second gate end 44 and fourth frame section 38. Upon the extension of the user's fingers and release of pressure on handle 70, gate member 40 automatically pivots away from interior space 16 and resumes its original closed orientation relative to fixed frame member 30. Gate member 40 is spring biased to maintain a closed position and effectively locks the handlebar or frame member within hook article 1. Once the frame member or handlebar is positioned within interior space 16, hook article 1 can be reoriented so it hangs from the frame member or handlebar by first body end 18, wherein the frame member or handlebar is positioned adjacent to, engages and abuts first body end 18.

Hook article 1 can be reopened by subsequently retracting handle 70 towards interior space 16 in the same manner as discussed above. The handles of a diaper bag, shopping bag, purse, hand bag, backpack or combinations there of can be slipped through the opening between second gate end 44 and fourth frame section 38 and onto fourth frame section 38. The handles can be arranged in interior space 16 so as to contact, engage and hang over second body end 20. Upon releasing handle 70, gate member 40 resumes a closed position. The spring biased pivotal gate member 40 prevents hook article 1 from becoming inadvertently detached from a child carrier and ensures that articles retained with in hook article 1 do not accidentally slip out of interior cavity 16.

Hook article 1 and the bag handles retained therein can be removed from the stroller handlebars or frame member and transferred to another structure. For example, hook article 1 can be rotated so that the bag handles are repositioned against first body end 18 and the handlebar or frame member is moved to second body end 20. Alternatively, hook article 1 can be lifted or otherwise moved so that the handlebar or frame member is repositioned adjacent to second body end 20 without rotating hook article 1. Upon retracting handle 70 and gate member 40, the handlebar or frame member can be removed from the opening formed between second gate end 44 and fourth frame section 38. Upon releasing handle 70, hook article 1 assumes a closed position. The user can then hold and carry hook article 1 and the bag handles within interior space 16 by one or more hand grips positioned on hook article 1. For example, the user can rotate hook article 1 to a side so that he retains hook 1 by the hand grip textured region 94 positioned on sleeve 90 opposite gate member 40. Alternatively, the user can hold hook article 1 by gate member 40, either by inserting his fingers into handle 70, specifically a hole 74 defined by or an open space partially defined by one or more handle members 72 and/or gate member 40. In this embodiment, the user's fingers circle gate member inner face 60, which can have a scalloped configuration adapted to conform to the user's fingers to facilitate gripping. Alternatively, the user can either hold hook article 1 by extending his fingers around handle member outer surface 86.

Hook article 1 can then be attached to a handlebar, frame member or hook of another structure, such as a shopping cart, wheelchair, or motor vehicle by again retracting handle 70 and gate member 40 towards inner space 16. The handlebar, frame member or hook of the shopping cart, wheelchair or motor vehicle can then be inserted into the opening between second gate end 44 and fourth frame section 38 and repositioned within hook article 1 so as to be positioned adjacent to first body end 18.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A hook article, comprising:
   a body defining an enclosed interior space, wherein the body comprises:
      a frame member;
      a gate member comprising:
         a first end pivotally hinged to the frame member; and
         a second end movable with respect to the frame member allowing access into the interior space; and
      a one-piece handle integral with the gate member, wherein the one-piece handle comprises a handle member that protrudes from an innermost peripheral face of the gate member into the interior space to define a gripping portion spaced apart from the gate member that is confined by an opposite inner face of the frame member and facilitates pivotal retraction of the gate member towards the interior space.

2. A hook article according to claim 1, wherein the one-piece handle is positioned adjacent to the second end.

3. A hook article according to claim 1, wherein the handle member extends between the second end and a middle section of the gate member.

4. A hook article according to claim 1, wherein the one-piece handle is inset with respect to the first end or the second end of the gate member.

5. A hook article according to claim 1, wherein the one-piece handle has an open configuration and wherein the one-piece handle comprises the handle member, gate member surface or combination thereof that defines an open space for receiving a finger.

6. A hook article according to claim 1, wherein the handle has a closed configuration and wherein the one-piece handle comprises the handle member, gate member surface or combination thereof that defines a hole for receiving a finger.

7. A hook article according to claim 6, wherein an outer surface of the one-piece handle defining the hole comprises a scalloped or wave like configuration.

8. A hook article according to claim 6, wherein an interior surface of the gate member or an inner surface of the one-piece handle has a scalloped or wave like configuration.

9. A hook article according to claim 6, wherein the hole has a length of about 40 mm to about 80 mm.

10. A hook article according to claim 1, wherein the body has a shape selected from the group consisting of: a circle, oval, pear shape or combination thereof.

11. A hook article capable of being attached to a child carrier, wherein the hook article comprises:
    a body defining an enclosed interior space, wherein the body comprises:
       a frame member;
       a gate member comprising:
          a first end pivotally hinged to the frame member; and
          a second end movable with respect to the frame member allowing access into the interior space; and a handle integral with the gate member and positioned adjacent to the second end, wherein the handle comprises a handle member that protrudes from an innermost peripheral face of the gate member into the interior space that is confined by an opposite inner face of the frame member and is spaced apart from the gate member to define a hole that receives a user's finger to facilitate pivotal retraction of the gate member towards the interior space.

12. A hook article according to claim 11, wherein the body further comprises:
a first body end configured to be attached to a handlebar or a frame member of a child carrier, wherein the first body end has a shape selected from the group consisting of curved configuration, arcuate configuration, dome shape, circular shape, semicircular shape and oval shape and a second body end for receiving one or more articles, wherein the second body end is spaced apart from and opposite to the first body end.

13. A hook article according to claim 12, wherein a width or diameter of an inner surface of the first end is about 32 mm to about 50 mm.

14. A hook article according to claim 11, wherein the body has a shape selected from the group consisting of: a circle, oval, pear shape or combination thereof.

15. A hook article according to claim 12, wherein an inner surface of the second body end has a greater width or diameter than an inner surface of the first end.

16. A hook article according to claim 11, further comprising a sleeve covering a portion of the frame member, gate member or combination thereof, wherein the sleeve comprises a non-slip surface to facilitate gripping.

17. A hook article according to claim 16, wherein the sleeve covers the first body end and an adjacent side of the body member, wherein the sleeve comprises a textured grip area to facilitate gripping.

18. A hook article, comprising:
a body defining an enclosed interior space, wherein the body comprises:
a frame member;
a gate member comprising:
a first end pivotally hinged to the frame member;
a second end movable with respect to the frame member allowing access into the interior space; and
a handle integral with the gate member, wherein the handle comprises a handle member that protrudes from an innermost peripheral face of the gate member into the interior space to define a gripping portion spaced apart from the gate member that is confined by an opposite inner face of the frame member.

19. A hook article according to claim 1, wherein an outer surface of the gate member includes a scalloped or wave like configuration.

* * * * *